Jan. 22, 1952     A. C. BODY     2,582,955
HIGH-FREQUENCY INDUCTION-HEATING APPARATUS

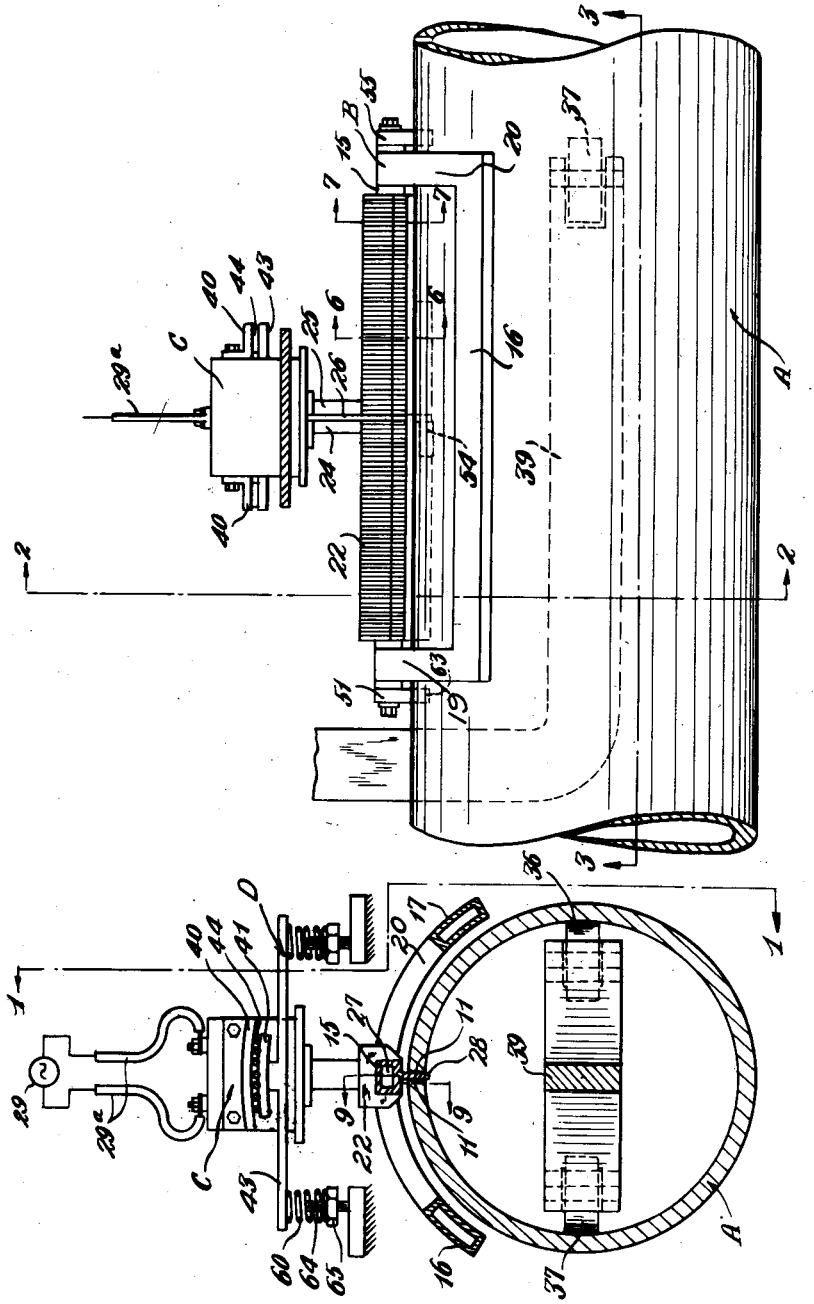

Filed April 7, 1949     2 SHEETS—SHEET 2

INVENTOR.
Alfred C. Body

Patented Jan. 22, 1952

2,582,955

UNITED STATES PATENT OFFICE 2,582,955

HIGH-FREQUENCY INDUCTION-HEATING APPARATUS

Alfred C. Body, Cleveland, Ohio, assignor to The Ohio Crankshaft Company, Cleveland, Ohio, a corporation of Ohio Application April 7, 1949, Serial No. 86,054

16 Claims. (Cl. 219—6)

This invention pertains generally to the art of high-frequency electric induction heating and, more particularly, to high-frequency electric inductor construction and associated apparatus.

The invention, in some of its aspects, is particularly adapted, although not limited, to the field of heating the opposed edges of skelp to elevated temperatures for welding into pipe and will be described as specifically applied thereto, although it is to be understood that at least certain aspects of the invention are applicable to other and broader fields.

In the field of heating the opposed edges of skelp for welding into pipe, the application of Phillips N. Sorenson, Serial No. 58,228, filed November 4, 1948, shows high-frequency electric inductors including a main conductor adapted to be positioned exteriorly of the skelp and to extend in close spaced parallel relationship to the edges to be heated. High-frequency electric currents in this conductor creates a dense high-frequency flux field which threads through the edges of the skelp causing high-frequency currents to be crowded into and flow along the edges. These currents, on the order of thousands of amperes per square inch, heat the edges to the welding temperature in a time interval less than 0.5 second.

In many respects, the high-frequency flux field flows in a plane tangent to the circular arc of the skelp or essentially in a plane parallel to the surfaces of the skelp adjacent the edges. This flux concentration decreases rapidly as a function of the distance from the conductor itself. In thick-walled skelp, the outer surfaces of the metal shield the inner surfaces from the flux field and this combined with the natural decrease in flux concentration results in a problem of obtaining a sufficient flow of flux through the inner corners of the edges to provide the desired amount of heating at this point. With this flux-field variation, the spacing between the main inducing conductor and the surface of the skelp becomes critical and must be held to a minimum.

Also in some tube-welding mills, there is a tendency for the skelp to wander or weave slightly and the spacing between the outer surfaces of the skelp and the inductor tends to vary slightly, effecting a slight variation in the amount of heat induced. Some spacing, at least greater than the maximum movement of the skelp, has been necessary; because if the skelp should touch the inductor in two or more places simultaneously, a completed electrical circuit would be established which would destroy the conductor or seriously scar the outer surface of the skelp. Insulating layers on the skelp adjacent the surface of the conductor might possibly be used. To date, no insulating material has been found which can withstand the abrasion of metal moving past and rubbing at high rates of speed, and this is particularly so at the elevated temperatures to which the skelp is heated.

If the minimum spacing is used, still another problem exists in that as the edges are heated to welding temperatures, the amount of heat radiated therefrom increases tremendously. With the inductor in close spaced relationship thereto, a very large amount of radiated heat is absorbed by the inductor itself, which heat is in addition to the heat generated in the conductor due to its $I^2R$ losses. With high-power inputs to the inductor, cooling to remove the heat from $I^2R$ losses in the inductor is a problem. The absorption of radiated heat adds to this cooling burden.

Another problem exists where it is necessary to obtain heating only on the extreme edges of the skelp. Normally, the central conductor is made quite narrow. However, as the conductor becomes narrower, alignment thereof with the edges becomes critical. A slight sideward movement of the edges of the skelp relative to the inductor results in unequal heating of the edges. It is presumably possible to place guides bearing against the side of the skelp to accurately position it relative to the conductor. However, the tendency of such guides is to close the gap before any true guiding action is obtained. Additionally, such guides are normally of metal and must be within the high-frequency flux field of the inductor whereby currents are induced to flow therein resulting in undesired heating.

In view of the above, it is an object of the present invention to provide a new and improved high-frequency electric inductor for inducing currents to flow in the close-spaced, opposed edges of skelp so formed and constructed as to cause the major portions of the flux field to thread through or traverse the entire width of each edge.

Another object is an inductor including a conductor wider than the spacing of the edges and extending parallel thereto and having a narrow portion adapted to be disposed in the space between the edges.

Still another object is an inductor having a portion disposed between the edges of the skelp which terminates short of the exit end of the inductor whereby the skelp edges may be brought into abutment at the earliest possible moment after leaving the inductor.

Still another object is in a skelp seam welder, the provision of a spreader operating in combination with the inductor for holding the edges in spaced relationship against the collapsing effect of the welding rolls to permit a maximum length of a portion on the inductor to be between the edges while still permitting the edges to be brought into welding engagement in a minimum spacing from the inductor itself.

Another object of the invention is the provision of an inductor which may rest on and be supported by a moving workpiece without completing an electrical circuit with the workpiece.

Still another object is the provision of a high-frequency electric inductor particularly adapted to be in close spaced relationship to a workpiece moving rapidly therepast, which inductor has one or a plurality of spacers or pads of a hard wear-resisting metallic material extending slightly beyond the workpiece-adjacent face of the inductor to engage the workpiece and effect a positive uniform spacing of the conductor from the workpiece without completing an electric circuit through the workpiece and inductor.

Another object is the provision of a high-frequency electric inductor having a plurality of hard wear-resisting spacing pads of a metallic material which is capable of withstanding abrasion and high temperatures, such as sintered tungsten-carbide, some of which pads are in electrically-insulating relationship with the inductor whereby they do not complete an electric circuit when they engage the workpiece.

Still another object is the provision of a high-frequency electric inductor having at least a high heat-reflecting workpiece adjacent the surface to eliminate as far as possible absorption of radiated heat by the inductor from the heated workpiece.

Still another object is the provision of a high-frequency electric inductor adapted to be in close spaced relationship with a substantial width of skelp for heating the opposed edges of such skelp or the like, which edges may move in a direction transverse to the axis thereof, the inductor being mounted for movement on an arc having a center corresponding generally to the axis of the skelp.

Still another object is the provision of a high-frequency electric inductor movably supported so as to remain in substantially fixed relationship with the opposed edges of moving skelp or the like, including means for translating transverse movement of the edges to move the inductor relative to its support and maintain the edges and the inductor in accurately disposed relationship.

Another object is the provision of a high-frequency electric inductor having an insulating material on the workpiece-adjacent surface extending in an unbroken surface across the slit of the inductor.

Generally speaking, the invention contemplates a high-frequency conductor of a greater width than the spacing of and adapted to extend parallel to the edges of skelp to be welded and having a portion narrower than the spacing at least for a portion of its length disposed intermediate the edges to force the high-frequency flux through and across the width of the edges themselves. The invention also contemplates a high-frequency electric inductor having at least a metallic spacer extending at least slightly beyond its workpiece-facing surface and capable of withstanding abrasion and high-temperatures and which may be movably supported to rest on the surface of a continuously moving elongated workpiece and follow any transverse movements thereof.

The invention further contemplates a high-frequency inductor having a high heat-reflecting workpiece-adjacent surface to reduce to a minimum the amount of radiated heat absorbed by the inductor. The invention still further contemplates an inductor movably supported to move in one or a plurality of directions to continuously maintain the most efficient heating relationship from the edges to be heated.

The invention may be embodied in certain parts and arrangements of parts, a preferred embodiment of which is described in this specification and illustrated in the accompanying drawings which are a part hereof, and wherein:

Figure 1 is a side elevational view partly in section of a length of skelp moving past a high-frequency electrical inductor and associated apparatus embodying the present invention. Figure 1 is taken generally on the line 1—1 of Figure 2.

Figure 2 is a side sectional view of Figure 1 taken approximately on the line 2—2 thereof and showing a preferred mounting for the transformer and inductor.

Figure 3:
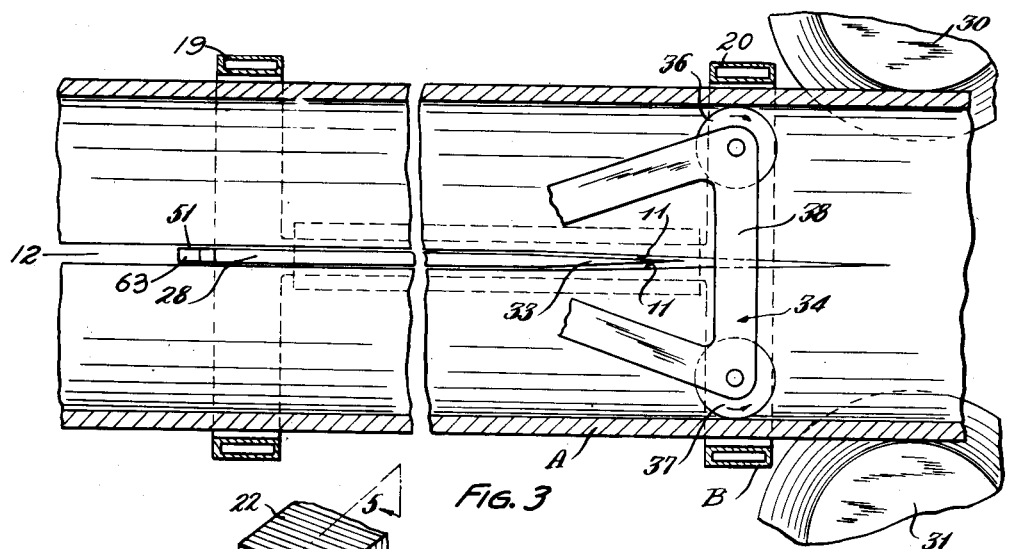
Figure 3 is a sectional view of Figure 1 taken approximately on the line 3—3 thereof and showing, in addition, the rolls of the skelp-welding machine for pressing the heated edges into welding engagement.
Figure 4:
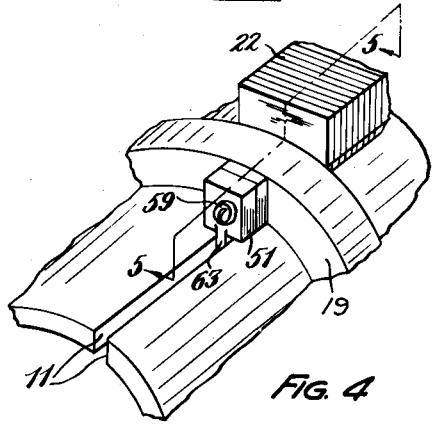
Figure 4 is an enlarged perspective view of the left-hand end of Figure 1.
Figure 7:
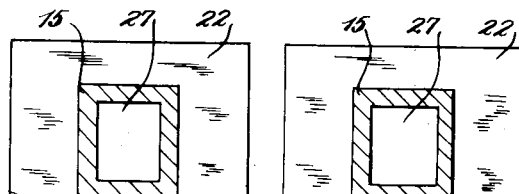
Figure 7 is a view similar to Figure 6 but taken on the line 7—7 of Figure 1.

Referring now to the drawings wherein preferred embodiments of the invention are shown for the purposes of illustration only and not for the purposes of limitation, Figure 1 shows a skelp A, a high-frequency electric inductor B in close spaced relationship to the skelp, a transformer C supporting the inductor and a mounting D for movably supporting the transformer and inductor, all constructed in accordance with the teaching of the present invention.

The skelp A is conventional and forms no part of the present invention. Suffice it to say for the purposes of describing the preferred embodiments of this invention that the skelp comprises a thin-walled metallic tube having opposed edges 11 with a small space 12 therebetween. The skelp A may be formed in any known manner, including either hot or cold forming, and in normal operation passes through the inductor B where its edges are heated to approximately 2700° F. Subsequently, the skelp passes into apparatus such as welding rolls 30, 31 which press the heated edges into pressure-welding engagement. These rolls also form no part of the present invention and are shown for the purposes of illustration only.

The inductor B shown comprises a generally central main conductor 15 and a pair of parallel side conductors 16, 17 interconnected at the ends by arcuate conductors 19, 20. The central conductor 15 is provided with a magnetically permeable material such as a stack of magnetic laminations 22. Conductor 15 is divided centrally and a pair of spaced fish-tail leads 24, 25 extend upwardly from the adjacent ends thereto and are bolted or otherwise fastened to secondary terminals of the transformer C. A layer of insulation 26 is disposed between the fish-tail leads.

The transformer C forms no part of the present invention and may be any conventional transformer construction suitable to the high-frequency, induction-heating field. A pair of flexible leads 29a, in this instance extending from the upper surface of the transformer, connect to a suitable high-frequency power source 29.

The inductor B is in many respects similar to the inductor shown and described in the above referred to Sorenson application. For a more detailed description of this type of inductor and its theory of operation, reference is made to the said Sorenson application.

The Sorenson application, as here, shows the width of the conductor 15 to be only slightly greater than the space 12 between the edges 11 and the lower surface of the conductor 15 to be in close spaced relationship to the outer surface of the skelp A. Also, the conductor 15 is centrally located relative to the edges 11 and extends in parallel relationship thereto for its entire length. The conductors each have interior cooling passages 27 through which water or the like is circulated.

The flux of the Sorenson application flows on an arc or plane generally tangent to the arc of the skelp. As is known, the flux field about a conductor decreases rapidly in proportion to the distance from the lower surface of the inductor. With thick-walled skelp, it is possible that an insufficient amount of flux will reach the inner corners of the edges 11 whereby the desired heating will not result. This situation is further aggravated by the shielding effect of the metal of the skelp.

Figure 6:
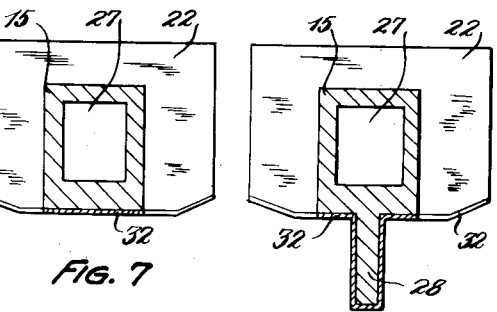
Figure 6 is an enlarged cross-sectional view taken approximately on the line 6—6 of Figure 1 showing a material having a high heat-reflecting surface affixed to the workpiece side of the inductor.
Figure 5:
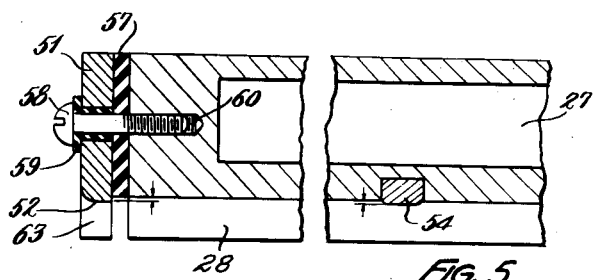
Figure 5 is a fragmentary sectional view taken approximately on the line 5—5 of Figure 4.

The present invention contemplates means for causing the flux of the main or central conductor to flow through and evenly across the entire width of the edges 11. In the embodiment shown, such means comprise a narrow rib or flange 28 disposed centrally of the lower surface of the conductor 15 and extending at least a portion of the length of the main conductor 15. The radial depth of the flange 28 is preferably such that with the lower surface of the conductor 15 at the desired spacing from the outer corner of the edges 11, the inner edge of the flange 28 will extend flush with the inner corner of the edges or into the interior of the skelp itself. In some instances, it may be shorter, if variations of heating are desired. The flange must not be too deep as then cooling thereof becomes a problem. The flange, while shown in Figure 6 as solid metal, may have a water passage therein. The width of the flange is slightly less than the space 12, although the space 12 must be so adjusted as to allow a sufficient thickness of the flange to permit heat generated therein to be conducted away to the conductor 15. The flange may be slightly tapered in width if desired to correspond to any tapering of the edges 11.

Such a construction insures that the entire flux, at least where the flange exists, about the central conductor 15 must thread the entire width of the edges 11.

Referring now to Figure 3, the skelp A moves from left to right and it is desired that as soon after the skelp leaves the right-hand end of the inductor B, the heated edges be brought into the proper pressure-welding engagement. The manner in which these edges are brought into engagement forms no part of the present invention and may be done by the rolls 31 in pressure engagement with the sides of the skelp and positioned just to the right of the inductor B. As the diameter of the skelp is collapsed to permit engagement of the edges 11, this collapse must of necessity commence somewhat to the left of the rolls themselves and, in some instances, may collapse enough that the edges 11 will be pinched together a sufficient amount while still under the inductor B as to engage or contact the flange 28. Accordingly, the flange 28 may be terminated short of the right-hand end of the inductor A as shown in Figure 1. As it is preferred that the length of the flange be as great as possible, the flange may be tapered at the right-hand end as shown at 33.

To insure that the width of the gap will have a sufficient width to receive the flange 28 for a maximum length of the inductor B, a spreader member 34 may be disposed interiorly of the skelp to space the edges while they are under the inductor itself. The spreader member 34 shown comprises a pair of rollers 36, 37 rotatably supported on spaced parallel vertical axes by a horizontally-disposed spreader bar 38. The spacing of the axes is such that the outer surfaces of the rollers 36, 37 will engage the inner surfaces of the skelp and prevent the collapsing effect of the rolls 30, 31 from being transmitted through the skelp to the left thereof a sufficient distance to pinch the flange 28.

The rollers 36, 37 may have a curved outer edge to correspond to the curvature of the inner surface of the skelp. The spreader bar 34 may be held in position by any desired means. In the embodiment shown, a draw bar 39 extends from the bar 38 beyond the left end of the inductor B internally of the skelp and then extends radially outwardly through the space 12 and is suitably secured to the frame of the welding machine as indicated schematically. By using the spreader member 34, the length of the flange 28 may be made a maximum and, in some instances, may extend the entire length of the conductor 15. It is preferred that the axial position of the spreader member 34 in the skelp be made adjustable by suitable means not shown.

It is preferred that there be a minimum of spacing between the lower surface of the conductor 15 and the outer surface of the skelp A. This is particularly so beyond the right end of the flange 28 or if for some reason or other the flange 28 is not employed as then the spacing between the conductor 15 and the skelp is a bigger factor. The spacing problem is in actual practice aggravated as there is normally some movement or weaving of the skelp both vertically and horizontally as it passes from the last forming die under the inductor to the welding die. Should the skelp touch or contact the conductor 15 in more than one place at the same instant, a completed electric circuit would result which might destroy the inductor. Heretofore, it has been necessary to space the lower surface of the central conductor 15 from the surface of the skelp a distance greater than a maximum expected movement of the skelp to insure against such touching or contact.

The present invention contemplates means whereby a minimum of spacing between the lower surface of the main conductor 15 and the surface of the skelp or workpiece may at all times be maintained and also an inductor which may actually rest upon the skelp itself and move vertically as the adjacent surface of the workpiece moves vertically. Thus, the inductor may be provided with one or more spacers capable of withstanding the abrasion of the moving workpiece or skelp, all of which may continuously contact the workpiece without at any time making a completed electric circuit. The spacer or spacers may extend a slight distance beyond or below the principal workpiece-facing surface of the conductor 15 and may at all times engage the surface of the workpiece or may only serve as an insurance that upon a maximum movement of the skelp transversely to its axis, a completed electrical circuit with the inductor will not occur.

In the embodiment of the invention shown, the spacers comprise a plurality of spacer pads rigidly mounted on the inductor and include a pad 51 fixed to the left-hand end of the inductor B. The pad 51 has a lower surface 52 which extends a slight distance below the lower surface of the main conductor 15. This spacing may be varied as desired. The leading or left-hand lower corner of the pad 51 is rounded as shown to prevent gouging of the pad into the surface of the skelp.

A second pad 54 is shown centrally of the conductor 15, which pad also extends a slight distance below the surface of the conductor 15 and preferably has a cylindrical surface having an axis transverse to the current flow such that if the pad should engage the surface of the skelp, a line contact results along an equal voltage gradient and no electrical current will flow. A third pad 55 is shown fixed to the right-hand end of the inductor B which is similar in construction to the pad 51 and has its lower left-hand corner rounded.

The pads 51, 54 and 55 are preferably made of a material which is wear and abrasion resistant; and, particularly in the case of the pad 55, capable of withstanding elevated temperatures. Such a material is sintered tungsten-carbide. Other metallic materials having the desired characteristics may be employed. Inasmuch as the lower surfaces of two or more pads can possibly engage the surface of the skelp simultaneously and thereby complete an electrical circuit, it is preferred that not more than one of the pads be electrically connected to the conductor. In this event, however, the inductor or the transformer secondary cannot be connected to the welding machine frame as is usual practice. Thus, in the embodiment shown, the pad 51 is electrically separated from the left end of the inductor B by an insulating member 57, and it is held on the end of the inductor B by a threaded bolt 58 extending through the pad 51 in an insulating sleeve 59 and into a threaded aperture 60 in the inductor. Other means of mounting may be employed, such as a manually-adjustable mounting so that the clearance of the inductor may be controlled.

The pad 55 may be similarly supported on the inductor.

The pad 54 is located generally centrally in a recess in the lower surface of the conductor 15 and is shown brazed or otherwise fixed therein. If desired, the pad 54 may be insulated from the conductor 15 by known means. The pad 55 is subjected to the high temperatures of the heated edges of the skelp. With the arrangement shown and the electrical insulation between the pad and the inductor, the pad may become heated to a considerable extent. There is no way for the pad to rid itself of the heat conducted thereto except by radiation in the air. In some cases, the pad 55 may be soldered or brazed directly to the right end of the inductor B, thus placing it in direct thermal and electrical conductive contact with the water-cooled portion of the inductor. In such an event, the pad 54 would normally be electrically insulated from the conductor 15 by some suitable means. Other pads may be employed or they may be arranged other than as shown. The spacers may also be formed as rollers.

It is preferred that the inductor be so supported as to have relatively free vertical movement so that it may follow accurately any vertical movements of the skelp A. Similarly, in order that the flange 28 can always be equally spaced between the edges 11 regardless of any weaving or circumferential movement of the edges, it is preferred that the inductor also be movable in a general horizontal direction. If the inductor moves horizontally to compensate for weaving of the edges 11, a variation in the spacing of the side conductors 16, 17 from the sides of the skelp might result. Accordingly, it is preferred that the inductor move transversely on an arc having a center corresponding to the axis of the skelp.

In the preferred embodiment, the transformer and inductor are mounted to move as a unit vertically and arcuately by the mounting D. The inductor may, of course, be mounted for movement alone if desired.

The mounting D may take a number of different forms but, as shown, comprises a base plate 43 which is mounted on the bed or base of the welding apparatus for vertical movement by a plurality of helical compression springs 60 having vertical axes. The base plate has an upwardly-facing convex bearing plate 41 on its upper surface. The transformer has brackets 40 fixed on the side thereof having downwardly-facing concave bearing surfaces complimentary to the surfaces of the bearing plate 41. Roller bearings 44 are disposed between the bearing surface to provide friction-free action. The center of curvature of the bearing surfaces 40, 41 is preferably parallel to and coincident with the axis of the skelp A. Thus, should the edges 11 move in a circumferential direction, the inductor may also be moved a corresponding amount without varying the spacing of the side conductors 16, 17 on the sides of the skelp A.

Any suitable means may be provided for transmitting any circumferential movement of the edges 11 to the inductor and transformer including servo-mechanism. In the preferred embodiment shown, the pad 51 is provided on its lower surface with a follower arm 63 which extends between the edges 11. Preferably, the circumferential width of this follower arm is slightly greater than the circumferential width of the flange 28. The sides of the arm 63 are engaged by the edges 11 and transmit any movement thereof to the inductor which can easily move by virtue of the mounting described.

The function of the springs 60 is to partly support the transformer and inductor so that they may be moved vertically upwardly with a minimum of effort. A counterbalance arrangement could also be provided. The spring mountings shown are relatively schematic and include adjusting means including a threaded shaft 64 extending upwardly from the welding apparatus base into the interior of each spring and an adjusting nut 65 on the shaft on which the spring rests. The nuts 65 are adjusted until the lower surfaces of the pads 51, 54 and 55 rest on the surface of the skelp with a slight pressure after which, as the skelp moves through the inductor, the inductor may actually follow any movements of the surface of the skelp or its edges, thus maintaining accurately the desired spacing between the conductor and the skelp which has been preset by the distance at the bottom of the pads and the lower surface of the conductor 15.

It will be appreciated that other spacers could be provided elsewhere on the inductor B and, particularly, under the side conductors 16, 17.

The present invention also contemplates a high-frequency electric inductor; for example, the type shown in Figure 1, having provision for reducing to a minimum the amount of radiated heat from the workpiece absorbed by the surface of the inductor including a surface on the conductor and laminations having a high heat-reflective factor. This surface may be obtained in a number of different ways such as polishing the surface of the conductor or laminations to a high degree by known methods. Unless the material thereof is nontarnishing or noncorrosive, such a surface will not retain its desired characteristics in actual use. Accordingly, the preferred embodiment shows the workpiece-facing surface of the conductor 15, flange 28 and lamination 22 provided with a thin coating 32 of a noncorrosive material such as chromium, nickel or the like polished to a high degree.

Figure 9:
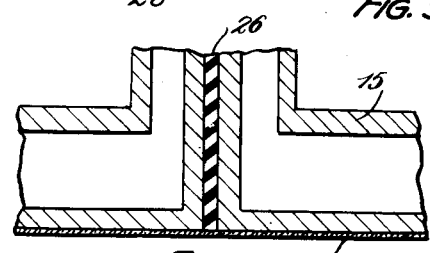
Figure 9 is an enlarged sectional view of Figure 2 taken on the line 9—9 showing an electrical-insulating and heat-reflective layer on the workpiece side of the inductor.

An electrical insulating refractory material 66; such as porcelain enamel, silimanites mixed with silicon esters and baked, or beryllium oxide, may also be coated on the workpiece-facing surfaces of the inductor. If such an electrical insulating refractory material is employed, it should extend across and completely cover the gap between the two parts of the main conductor 15, including the lower end of the insulation 26 as is more clearly shown in Figure 9. Such materials should preferably be pigmented so as to have a high heat-reflective coefficient whereby the inductor will absorb the minimum amount of radiated heat from the workpiece itself.

These coatings in conjunction with the spacers above described permits of a very efficient inductor-workpiece arrangement which may operate effectively over long periods of time without attention.

In some instances, because of the high current concentrations in the lower surface of the conductor, it may be necessary to silver-plate the lower surface to provide a layer of material having a low resistivity but capable of retaining a high polish. With the close spacing required in the heating for welding of skelp, the high heat-reflective surface is particularly of value.

Figure 8:
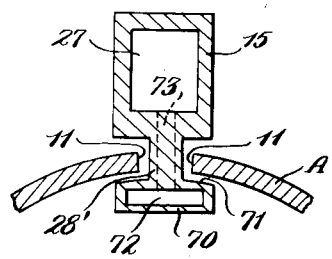
Figure 8 is a view similar to Figure 6 but showing a modified construction of the preferred embodiment.

Figure 8 shows a modified flange arrangement over the preferred embodiment shown in Figures 1 to 7. In this embodiment, like parts have been indicated by like numbers and modified parts by identical numbers with a prime (') mark added. Figure 8 shows the main or central conductor 15 with the flange 28' so modified as to further force the flux of the inductor to flow through and across the edges 11. In this embodiment, the flange 28' is of a length such as to extend into the interior of the skelp itself and its inner end is provided with laterally-extending flanges 70, which form with the lower surface of the conductor 15 a pair of channel-like spaces into which the edges 11 may extend. As shown, the upper surfaces 71 of the flanges 70 are curved to conform to the curvature of the interior surface of the skelp A. Also, the portion 70 may be provided with cooling passages 72 interiorly thereof through which a suitable cooling medium may be circulated to prevent overheating of this portion of the inductor. Cooling water may be circulated into the passage 72 from the passage 27 through passages 73 at either end of the flange and horizontal portion 28' and 70 respectively.

Thus, it will be seen that embodiments of the invention have been described in detail which clearly accomplish the objects of the invention and others and that the invention provides high-frequency electric inductor and associated apparatus usable for many purposes where high-efficiency heating is required with a minimum of operational difficulties such as nonuniformity of heating of spaced edges caused by unavoidable and undesired movement of the workpiece, heat radiation to the inductor and continuous close electrical coupling to the workpiece on touching of the inductors by the workpiece.

It will be obvious that modifications and alterations of the specific preferred embodiments shown differing radically in appearance will occur to others upon a reading and understanding of the invention described in this application. It is my intention that all such modifications and alterations shall be included as part of my invention insofar as they come within the scope of the appended claims.

Having thus described my invention, I claim:

1. In high-frequency induction-heating apparatus adapted to heat the opposed spaced edges of a rapidly-moving skelp, said apparatus comprising an inductor including a conductor in close spaced parallel relationship to the edges to be heated, said conductor being wider than the space between said edges and having a centrally disposed flange narrower than the space between said edges and extending between said edges, said inductor having metallic spacer members adapted to engage surfaces of said skelp and space said conductor from said edges a predetermined amount, means mounting said inductor for movement both in a radial plane and arcuately about an axis of said skelp, whereby said inductor may rest at least in part on said skelp and move up and down therewith and sidewardly to correspond to transverse movements of said skelp as it progresses past said inductor.

2. The combination of claim 1 wherein a spreader member is provided internally of the skelp adjacent the exit end of the inductor adapted to prevent collapse of the spacing between the edges of the skelp while under the inductor.

3. A high-frequency electric inductor adapted to be disposed in close spaced relationship to an elongated workpiece having continuous relative movement in relation thereto, said inductor being elongated including a metallic spacer member of a hard wear-resistant material centrally disposed of said inductor, said spacer having an arcuate surface adapted to engage the surface of said workpiece, the axis of said arcuate surface extending transversely to the direction of current flow whereby said spacer can only engage said skelp on a line of uniform electrical potential and engagement of said spacer with said workpiece does not complete an electrical circuit.

4. In a high-frequency electric induction-heating apparatus for progressively heating a rapidly-moving, elongated member, said apparatus including a high-frequency inductor having spacers adapted to continuously engage the surface of said workpiece, means mounting said inductor for free movement in a direction transverse to the line of movement of said workpiece whereby as said workpiece moves transversely from its line of movement, said inductor may move to conform thereto.

5. In high-frequency induction-heating apparatus adapted to heat to a welding temperature the spaced opposed edges of a rapidly-moving skelp, said apparatus including an inductor substantially freely movable in a radial plane through said edges, said inductor including portions resting on and being at least partially supported by said skelp.

6. In high-frequency induction-heating apparatus for heating the opposed edges of rapidly-moving skelp to a welding temperature, said apparatus including an inductor in close spaced relationship with said skelp, said inductor extending over a substantial arcuate width of said skelp and being freely movable on an arc having a center substantially coinciding with the center of said skelp.

7. The combination of claim 6 wherein follower means are provided for engaging said skelp and moving said inductor in an arcuate direction to correspond to circumferential movements of the edges of said skelp.

8. A high-frequency electric inductor adapted to uniformly heat slightly-spaced edges of an elongated workpiece, said inductor comprising a conductor having a width greater than the spacing of said edges and adapted to be in close spaced parallel relationship with said edges, said conductor having on its workpiece-facing side a narrow flange of a width less than the space between the edges and adapted to extend therebetween.

9. A high-frequency electric inductor adapted to uniformly heat a pair of spaced edges of an elongated workpiece, said inductor comprising an elongated conductor of a width greater than the spacing of said edges and adapted to extend in parallel close spaced relationship with said edges, the workpiece-facing surface of said conductor having a central flange of a width less than the width of said space and adapted to extend between said edges, said flange having a length less than the length of said conductor.

10. The combination of claim 9 wherein said flange as it terminates short of said conductor also tapers gradually in width.

11. A high-frequency electric inductor adapted to be in close spaced relationship to an elongated workpiece having relative movement in relation thereto, said inductor having a plurality of metallic spacer members fixed thereto and adapted to engage surfaces of said workpiece and maintain a uniform spacing between portions of said inductor and said workpiece, at least some of said spacers being insulated from said inductor and not more than one being in electrical contact therewith.

12. A high-frequency electric inductor adapted to be disposed in close spaced relationship to an elongated workpiece having relative movement in relation thereto, said inductor having a spacer adapted to maintain uniform spacing with said workpiece, said spacer comprising a plurality of pads of a hard wear-resistant metallic material such as sintered tungsten-carbide, not more than one of said pads being electrically connected to said inductor.

13. In a high-frequency electric inductor comprising at least a conductor having a workpiece-adjacent surface adapted to be in close spaced inductive relationship with a workpiece to be heated, said conductor and workpiece-adjacent surface having a narrow slit therethrough and electrical insulating means in said slit, the improvement which comprises an electric-insulating material on said surface at least adjacent to and across said slit.

14. The combination of claim 13 wherein the insulating material is a porcelain enamel and forms a continuous smooth unbroken surface over said slit.

15. The combination of claim 13 wherein the electrical-insulating material along said surface is a pigmented porcelain enamel having a high heat-reflective factor.

16. The combination of claim 13 wherein the inductor has a plurality of hard wear-resistant spacer pads mounted thereon and extending beyond said workpiece-adjacent surface a distance at least equal to the thickness of said electrical-insulating material along said surface.

ALFRED C. BODY.

REFERENCES CITED

The following references are of record in the file of this patent:

UNITED STATES PATENTS

| Number | Name | Date |
|---|---|---|
| 2,146,430 | Hazen | Feb. 7, 1939 |
| 2,227,866 | Somes | Jan. 7, 1941 |
| 2,256,873 | Somes | Sept. 23, 1941 |
| 2,399,897 | Somes | May 7, 1946 |
| 2,460,687 | Fuchs | Feb. 1, 1949 |
| 2,461,323 | Hille | Feb. 8, 1949 |

FOREIGN PATENTS

| Number | Country | Date |
|---|---|---|
| 485,651 | Great Britain | May 19, 1938 |